United States Patent

Gotoh et al.

Patent Number: 5,341,355
Date of Patent: Aug. 23, 1994

[54] MULTIBEAM OPTICAL PICKUP AND SERVO METHOD THEREOF

[75] Inventors: Hiroshi Gotoh, Kawasaki; Isamu Shibata, Fuchu; Ikuo Maeda, Kawasaki; Tatsuaki Sakurai, Yokohama, all of Japan

[73] Assignee: Ricoh Company, Ltd.

[21] Appl. No.: 350,567

[22] Filed: May 11, 1989

[30] Foreign Application Priority Data

May 20, 1988 [JP] Japan ................. 63-123040
May 24, 1988 [JP] Japan ................. 63-126495

[51] Int. Cl.⁵ .............................. G11B 7/00
[52] U.S. Cl. ................ 369/44.37; 369/44.38; 369/44.24
[58] Field of Search ........... 369/44.23, 44.13, 110, 369/111, 109, 122, 44.11, 121, 43, 44.37, 44.38, 44.39, 116, 44.41, 44.42, 100, 116; 250/201.5

[56] References Cited

U.S. PATENT DOCUMENTS

| | | | |
|---|---|---|---|
| 4,507,763 | 3/1985 | Kato | 369/44.38 |
| 4,538,257 | 8/1985 | Klinger | 369/116 X |
| 4,546,463 | 10/1985 | Opheij et al. | 369/111 |
| 4,571,712 | 2/1986 | Romano | 369/44.38 X |
| 4,621,351 | 11/1986 | Baer et al. | 369/44.38 X |
| 4,700,336 | 10/1987 | Yoshida et al. | 369/44.38 X |
| 4,841,514 | 6/1989 | Tsuboi et al. | 369/100 |
| 4,888,756 | 12/1989 | Shikichi et al. | 369/124 X |
| 4,935,913 | 6/1990 | Shinoda | 369/44.11 |
| 5,023,860 | 6/1991 | Ueda | 369/44.37 |

FOREIGN PATENT DOCUMENTS

| | | | |
|---|---|---|---|
| 0007636 | 1/1985 | Japan | 369/44.39 |
| 0000934 | 1/1986 | Japan | 369/44.38 |
| 0121936 | 6/1987 | Japan | 369/44.37 |
| 0164232 | 7/1987 | Japan | 369/44.38 |

*Primary Examiner*—Aristotelis Psitos
*Assistant Examiner*—Thang V. Tran
*Attorney, Agent, or Firm*—Cooper & Dunham

[57] ABSTRACT

A servo method in a multibeam optical pickup in which, at the time of a recording mode, a record information is confirmed and reproduced by a beam for reproduction while the record information is written by a beam for record, and the record information is reproduced by the beam for reproduction at the time of a reproducing mode, comprises the steps of detecting a focus servo signal and a track servo signal with respect to each of the beams for record and reproduction reflected by an optical disk; performing focusing and tracking operations based on the focus servo signal and the track servo signal provided by the beam for record at the time of the recording mode; and performing the focusing and tracking operations based on the focus servo signal and the track servo signal provided by the beam for reproduction at the time of the reproducing mode. In another servo method, the focusing and tracking operations may be performed according to the recording and reproducing modes. An optical pickup comprises a detector for detecting respective track error signals with respect to the preceding and subsequent beams; a tracking control device for performing a tracking servo control by the track error signal detected based on one of the beams; and a tangential control device for performing a tangential servo control by the track error signal detected based on the other of the beams.

15 Claims, 2 Drawing Sheets

MULTIBEAM OPTICAL PICKUP AND SERVO METHOD THEREOF

BACKGROUND OF THE INVENTION

The present invention relates to an optical pickup of an optical disk apparatus and a servo method in a multibeam optical pickup.

Recently, a multibeam optical pickup has been practically used in an optical disk apparatus. In such a multibeam optical pickup, an optical path for lighting is constructed such that a plurality of beams from a semiconductor laser array can be guided onto an optical disk by a common optical path. One of the plural beams is used for record and another one of the plural beams is used for reproduction. At the time of the recording mode, while a record information is written by the recording beam, the confirmation and reproduction are performed by the reproducing beam. At the time of the reproducing mode, the record information is reproduced by the reproducing beam.

There are two modes of record and confirmation-reproduction with respect to the recording operation onto the optical disk so that the time required to perform the recording operation becomes long in the conventional single beam system. However, in the multibeam optical pickup, the writing operation and the confirming-reproducing operation are almost simultaneously performed so that the problems about the recording time can be effectively solved.

Such a multibeam optical pickup has the following problems.

At the time of the recording mode, no shift is caused with respect to the reproducing beam since each servo signal is provided from the reproducing beam. However, there is a possibility in which a shift is caused with respect to the recording beam so that the reliability of a written bit is reduced. Since the confirmation and reproduction are performed in the recording mode, it can be considered that the recording operation is suitably performed as long as the confirmation and reproduction are correctly performed. However, when the reproduction is performed in another optical pickup, problems about the reproduction of the record information can be caused by the shift of the recording beam.

In the optical disk apparatus, a beam from a semiconductor laser is focused onto a small spot by an objective lens and is irradiated onto the optical disk to record, reproduce or erase the information. Such an optical disk apparatus has the advantages that the optical disk has a large capacity and the cost per bit is cheap and the optical disk is removable, thereby facilitating the treatment thereof.

However, this optical disk apparatus has the disadvantages that the processing time is longer than that in hard disk such as a magnetic disk, etc. Namely, when the recording operation is performed by the optical disk and a command is given, an accessing operation is first performed and a small spot is moved to a desired address position to perform the recording operation. After the recording operation has been completed, the reproducing operation is performed to confirm a written information. The processing time becomes long by such a construction. In the optical disk apparatus, the recording mode of the optical disk is constituted by the recording operation and the confirming-reproducing operation.

To solve such problems about the processing time, the optical pickup of a multibeam system has been proposed. In this system, a plurality of laser beams are converged onto the same track of the optical disk. almost at the same time when the recording operation is performed by a preceding beam, the reproducing operation for confirming the written information is performed by a subsequent beam. By such a system, both the recording operation and the reproducing operation for confirmation are almost simultaneously performed so that the time required in the recording mode can be reduced. The optical pickup of such multibeam system is disclosed in Japanese published patent No. 57-60697 for example.

In the pickup for performing the recording operation and the confirming-reproducing operation by two beams, a servo control is performed by providing a servo signal for track/focus from the subsequent reproducing beam. The reason is that, since light is emitted by a constant power on the reproducing beam side, the operation is considered to be simpler and more stable than that for providing the servo signal based on a modulated light such as the recording beam.

However, in such a pickup, since the servo signal is provided by confirming-reproducing beam B at the recording time, a track shift can be caused with respect to recording beam A although no track shift is caused with respect to confirming-reproducing beam B. The reason is that, even when reproducing beam B is located in a correct position with respect to the track, recording beam A is not always located in a correct position with respect to the track. As a result, the track shift with respect to the pit recorded by recording beam A can be caused so that a reliable recording operation cannot be performed.

Further, the information recording medium judged to be recorded in such a state of the track shift and a focus shift and correctly recorded by the confirming-reproducing operation, tends to cause errors in operation when the shift of the reproducing beam is reproduced in another drive different from the drive in which the shift is recorded. Therefore, the reliability of the information recording medium is reduced.

Further, the track shift is caused with respect to the recording beam and the reliability of the recording operation is reduced when the information recording medium is eccentric. The track shift can be caused by the difference in curvature between the inner and outer circumferences of the track, a disturbance of the track, the eccentricity of the optical disk, etc.

There is a method for providing a signal for the focus/track servo control based on preceding beam A for record instead of subsequent beam B for reproduction. However, even in such a method, the focus or track shift is caused with respect to the subsequent beam for confirmation and reproduction. Therefore, even when the tracking servo control is performed by the beam for record to correctly perform the tracking operation, there is a case in which the track shift is caused with respect to the confirming-reproducing beam by the eccentricity of the recording medium.

SUMMARY OF THE INVENTION

It is therefore an object of the present invention to provide a new servo method having a very high reliability with respect to the record and reproduction of an optical information in a multibeam optical pickup.

Another object of the present invention is to provide an optical pickup for reliably performing the recording and confirming and reproducing operations.

The first object of the present invention can be achieved by a servo method in a multibeam optical pickup in which, at the time of a recording mode, a record information is confirmed and reproduced by a beam for reproduction while the record information is written by a beam for record, and the record information is reproduced by the beam for reproduction at the time of a reproducing mode, the servo method comprising the steps of detecting a focus servo signal and a track servo signal with respect to each of the beams for record and reproduction reflected by an optical disk; performing focusing and tracking operations based on the focus servo signal and the track servo signal provided by the beam for record at the time of the recording mode; and performing the focusing and tracking operations based on the focus servo signal and the track servo signal provided by the beam for reproduction at the time of the reproducing mode.

In accordance with another embodiment of the present invention, the first object of the present invention can achieved by a servo method in a multibeam optical pickup in which, at the time of a recording mode, a record information is confirmed and reproduced by a beam for reproduction while the record information is written by a beam for record, and the record information is reproduced by the beam for reproduction at the time of the reproducing mode, the servo method comprising the steps of providing a focus servo signal and a track servo signal with respect to one of the beams for record and reproduction reflected by an optical disk; providing the track servo signal with respect to the other of the beams for record and reproduction; performing a tracking operation based on the track servo signal provided by the beam for record and a focusing operation based on the focus servo signal at the time of the recording mode; and performing the tracking operation based on the track servo signal provided by the beam for reproduction while the focusing operation is performed on the basis of the focus servo signal at the time of the reproducing mode.

The second object of the present invention can be achieved by an optical pickup of an optical disk apparatus in which a recording or erasing operation of an information is performed by a preceding beam and the recorded information is confirmed and reproduced by a subsequent beam, the optical pickup comprising a detector for detecting respective track error signals with respect to the preceding and subsequent beams; a tracking control device for performing a tracking servo control by the track error signal detected on the basis of one of the preceding and subsequent beams; and a tangential control device for performing a tangential servo control by the track error signal detected on the basis of the other of the preceding and subsequent beams.

In the above construction, when a track shift is caused with respect to the preceding beam for record and the track error signal is detected, the preceding beam is correctly located on the track by the tracking servo control by the tracking control device. At this time, in accordance with the relation between the center of the optical disk and the track, the subsequent beam for confirmation and reproduction is also correctly located on the track if there is no eccentricity of the optical disk. However, when there is an eccentricity of the optical disk, the track error signal is generated with respect to the subsequent beam. When the tracking servo operation is performed on the basis of the track error signal of the subsequent beam, the track shift is caused with respect to the preceding beam, but both beams are correctly located on the track by tangentially displacing the beams by the tangential control device in accordance with the eccentricity of the optical disk. The above operation is similarly performed even when the relation between both beams is reverse.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of an optical pickup and a servo method in a multibeam optical pickup in accordance with the present invention will now be described in detail with reference to the accompanying drawings.

Figure 1:
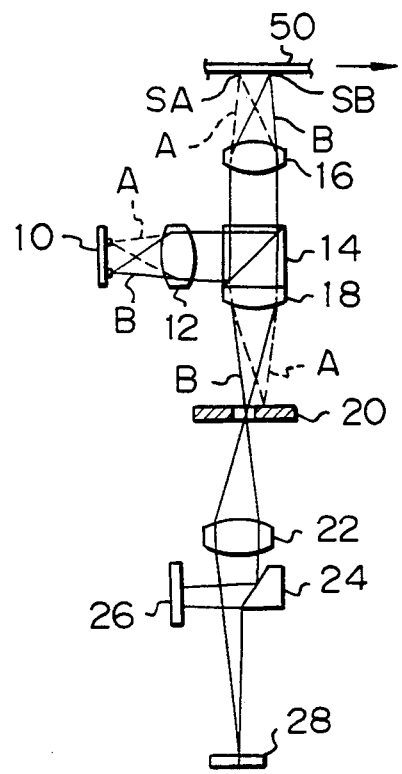
FIG. 1 is a schematic view showing the conventional optical construction of a multibeam optical pickup.

FIG. 1 schematically shows a main portion of one example of a general multibeam optical pickup. In this example, the multibeam optical pickup is constructed by a two-beam system.

Semiconductor laser array 10 has two light-emitting portions for independently emitting beams therefrom. When beams A and B are emitted from the respective light-emitting portions, beams A and B are respectively changed to parallel beams by collimator lens 12 and are reflected upwards by beam splitter 14 in FIG. 1. Then, beams A and B pass through objective lens 16 and are respectively converged by the action of objective lens 16 onto optical disk 50 as spots SA and SB. Collimator lens 12, beam splitter 14 and objective lens 16 constitute a common optical path for guiding and lighting beams A and B from semiconductor laser 10 as a light source to optical disk 50.

Optical disk 50 is rotated and moved in the direction shown by the arrow. Accordingly, beam A constitutes a preceding beam with respect to the relative movement between beam A and optical disk 50, and is used for record. Namely, beam A constitutes a beam for record. On the other hand, beam B constitutes a subsequent beam and is used for confirmation and reproduction at the time of the recording mode and is used for reproduction of the recording information at the time of reproduction. Namely, beam B constitutes a beam for reproduction.

When recording beam A and reproducing beam B are reflected by optical disk 50, beams A and B pass through objective lens 16 and beam splitter 14 and are separated from the optical path for lighting and are respectively converged by converging lens 18. Aperture 20 is arranged in the vicinity of a convergent portion of the beams and interrupts recording beam A and passes reproducing beam B therethrough. When reproducing beam B passes through aperture 20, this beam is converged by another converging lens 22 again and a portion thereof is incident onto prism mirror 24 and another beam portion is incident to light-receiving element 28 divided into two portions. The beam incident to prism 24 is reflected and is incident to light-receiving element 26 divided into two portions.

A focus servo signal is provided as a difference in signal from the respective light-receiving portions of light-receiving element 28 by a knife edge method in which an edge of prism mirror 24 is used as a knife edge. A track servo signal is provided as a difference in signal from the respective light-receiving portions of light-receiving element 26 by a push-pull method. The reflection intensity of reproducing beam B by optical disk 50 corresponds to a sum of outputs of the respective light-receiving portions of light-receiving element 26 for example, and thereby can be used as an RF signal.

At the time of the recording mode, while reproducing beam B is continuously lighted at a constant intensity and focusing and tracking operations are performed on the basis of the focus servo signal and the track servo signal provided as above, recording beam A is modulated by a record information signal with respect to intensity and thereby the writing operation is performed. The written record information is immediately confirmed and reproduced by reproducing beam B. At the time of the reproducing mode, while only reproducing beam B is continuously lighted at a constant intensity and the focusing and tracking operations are performed on the basis of the focus servo signal and the track servo signal provided as above, the record information is reproduced with the sum of the outputs of the respective light-receiving portions of light-receiving element 26 as an RF signal.

Figure 2:
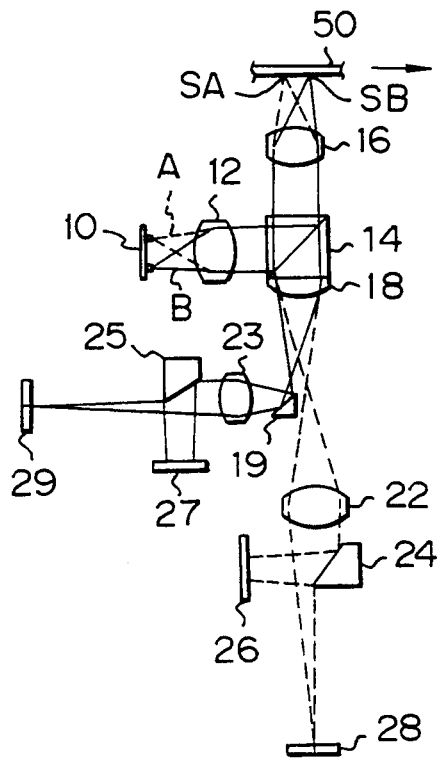
FIG. 2 is a schematic view showing a main portion of the multibeam optical pickup in a first embodiment of the present invention.

FIG. 2 schematically shows a main portion about a servo method in a multibeam optical pickup in accordance with a first embodiment of the present invention. For clarification, the same or corresponding portions as those in FIG. 1 are designated by the same reference numerals.

In this embodiment, similar to the above-mentioned description, the multibeam optical pickup is constructed by the two-beam system. An optical path for lighting from semiconductor laser array 10 to optical disk 50 has the same construction as that of the pickup of FIG. 1. Light beam A is a beam for record and light beam B is a beam for reproduction.

Recording beam A and reproducing beam B reflected by optical disk 50 pass through objective lens 16 and beam splitter 14 and are separated from the optical path for lighting and are converged by converging lens 18. The converged recording beam A is further converged by converging lens 22 and a portion thereof is reflected by prism mirror 24 and is incident to light-receiving element 26 for generating the track servo signal, and the remaining beam portion is incident to light-receiving element 28 for generating the focus servo signal. Reproducing beam B converged by converging lens 18 is reflected by prism mirror 19 arranged in the vicinity of a converging portion of beam B and is further converged by converging lens 23. A portion of beam B is reflected by prism mirror 25 and is incident to light-receiving element 27 for generating the track servo signal and the remaining beam portion is incident to light-receiving element 29 for generating the focus servo signal. With respect to both recording beam A and reproducing beam B, the focus servo signal is provided by the knife edge method and the track servo signal is provided by the push-pull method. Accordingly, in the multibeam optical pickup of FIG. 2, the focus servo signal and the track servo signal are provided with respect to both recording beam A and reproducing beam B.

At the time of the recording mode, while the focusing and tracking controls are performed on the basis of the focus servo signal and the track servo signal provided by recording beam A, the recording beam is modulated by the record information signal with respect to intensity and thereby a writing operation is performed, and reproducing beam B is continuously lighted at a constant intensity to perform the confirmation and reproduction.

At this time, the focusing and tracking operations are performed on the basis of the focus servo signal and the track servo signal provided by recording beam A so that no shift is caused with respect to recording beam A and thereby the writing operation is performed accurately and suitably. On the other hand, with respect to reproducing beam B for performing the confirmation and reproduction, an allowable width of the shift for reproduction is wider than that for record although a slight shift can be caused and the recording operation is accurately performed so that the confirmation and reproduction can be sufficiently performed preferably even when the slight shift is caused with respect to reproducing beam B.

At the time of the reproducing mode, while only reproducing beam B is continuously lighted at the constant intensity and the focusing and tracking operations are performed on the basis of the focus servo signal and the track servo signal provided by reproducing beam B, the reproducing operation is performed with the sum of the outputs of the respective light-receiving portions of light-receiving element 27 as an RF signal.

At the time of the reproducing mode, the focusing and tracking operations are performed by the servo signal provided by reproducing beam B so that no shift is caused with respect to reproducing beam B. A recorded pit is that recorded accurately and reliably by recording beam A and therefore has a high reliability and is read out accurately by reproducing beam B so that a very preferably reproducing image can be provided.

Figure 3:
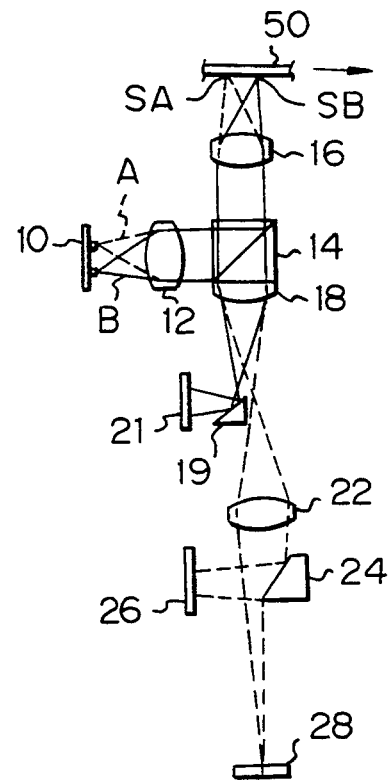
FIG. 3 is a schematic view showing a main portion of the multibeam optical pickup in a second embodiment of the present invention.

FIG. 3 schematically shows only a main portion about the servo method in the multibeam optical pickup in a second embodiment of the present invention. The same or corresponding portions as those in FIGS. 1 and 2 are designated by the same reference numerals.

Similar to the first embodiment of FIG. 2, recording beam A and reproducing beam B from semiconductor laser array 10 are guided by a common optical path for lighting to optical disk 50. The respective beams are reflected by optical disk 50 and are separated from the optical path for lighting and are converged by converging lens 18. Recording beam A thus converged is guided to a detecting system constructed by converging lens 22, prism mirror 24 and light-receiving elements 26 and 28.

The features different from those in the embodiment of FIG. 2 are that reproducing beam B converged by converging lens 18 is directly incident to light-receiving element 21 for detecting the track servo signal.

Namely, in this embodiment, the track servo signal is detected with respect to both recording beam A and reproducing beam B, but the focus servo signal is detected with respect to only recording beam A. The focus servo signal is detected by the knife edge method and the track servo signal is detected by the push-pull method. At the time of the recording mode, while the focusing and tracking operations are performed on the basis of the focus servo signal and the track servo signal provided by recording beam A, recording beam A is modulated and thereby the writing operation is performed. At this time, reproducing beam B is continuously lighted at the constant intensity and the confirmation and reproduction are performed with the output sum of the respective light-receiving portions of light-receiving element 21 as the RF signal.

At the time of the reproducing mode, both recording beam A and reproducing beam B are continuously lighted at the constant intensity and the focusing operation is performed by the focus servo signal provided by recording beam A, and the tracking operation is performed on the basis of the track servo signal provided by reproducing beam B.

Accordingly, even in this embodiment, it is possible to preferably perform the writing operation and the confirmation and reproduction and the recorded pit has a high reliability, similar to the embodiment of FIG. 2.

Further, at the time of the reproducing mode, no track shift is caused with respect to reproducing beam B. Beams A and B emitted from the respective light-emitting portions of the semiconductor laser array have the same wavelength. Accordingly, when beams A and B are converged by common objective lens 16, the converging positions of the respective beams become the same position in the direction of the optical axis. Thus, in a state in which recording beam A is converged onto optical disk 50, reproducing beam B is also converged onto optical disk 50. Accordingly, even when the focusing operation is performed by the focus servo signal provided by recording beam A at the time of the reproducing mode, reproducing beam B can be correctly converged onto optical disk 50. Thus, the tracking and focusing operations are suitably performed with respect to reproducing beam B, thereby preferably reproducing the record information suitably recorded by recording beam.

In the embodiment of FIG. 3, the focus servo signal is provided by recording beam A. However, the focus servo signal may be provided by reproducing beam B and the focusing operation with respect to the recording beam may be performed on the basis of the focus servo signal provided by the reproducing beam at the time of the recording mode. In the servo method in the embodiment of FIG. 3, it is necessary to light recording beam A and reproducing beam B at the time of both recording and reproducing modes, and continuously light beams A and B at the constant intensity at the time of the reproducing mode. However, the focus servo signal is detected with respect to only one of the beams so that the structure of the detecting system is simplified in comparison with that in the embodiment of FIG. 2.

As mentioned above, in accordance with the present invention, a new servo method in the multibeam optical pickup can be provided. In the present invention, the focusing and tracking operations are performed with respect to the recording beam at the time of the recording mode, and are performed with respect to the reproducing beam at the time of the reproducing mode so that the recording and reproducing operations of the optical information can be suitably performed. Accordingly, the reliability in record and reproduction with respect to the optical disk is greatly improved. The method for detecting the servo signal with respect to each beam is not limited to that shown in the embodiments, but the servo signal can be detected by another suitable known method.

Figure 4:
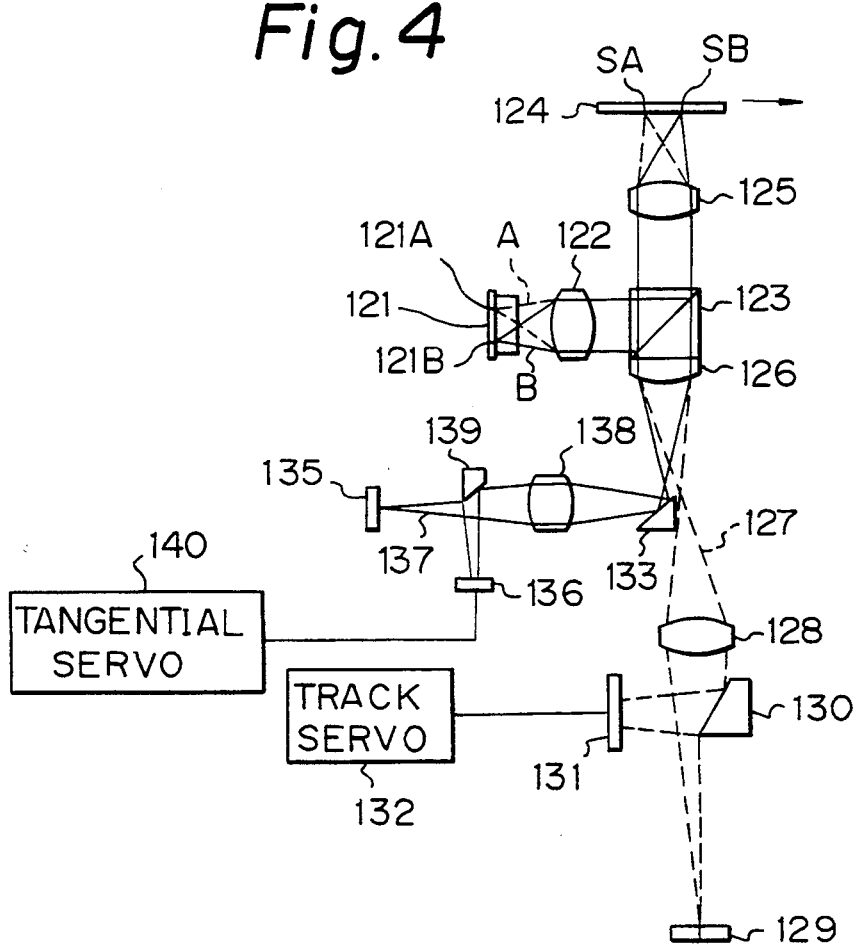
FIG. 4 is a view showing the optical construction of the optical pickup in a third embodiment of the present invention.

FIGS. 4 and 5 show the optical pickup in accordance with a third embodiment of the present invention. The basic construction of the optical pickup of these figures is similar to that of FIG. 1.

First, semiconductor laser 121 as a laser array has two light-emitting points 121A and 121B and emits two beams A and B. These beams A and B are changed to parallel beams by collimator lens 122 and thereafter are incident to beam splitter 123 and are deflected on the side of optical disk 124. In this case, the beams are focused and irradiated onto a small spot by objective lens 125 and beam A is converged as small spot SA and beam B is converged as small spot SB. Similar to the embodiment of FIG. 1, small spot SA of beam A shown by broken line is a preceding spot and is used for record. Beam A for record is modulated in accordance with the record information at the recording time. On the other hand, small spot SB by beam B shown by solid line is a subsequent spot formed on the same track as that of small spot SA and is used for confirmation and reproduction at the time of the recording mode and normal reproduction at the time of the reproducing mode.

After a reflected light from optical disk 124 passes through objective lens 125 again, the light is incident to beam splitter 123 and is separated from the incident light. Then, while the light is converged by first converging lens 126, the light is guided onto the side of optical system 127 for detecting the focus/track. The converging positions by converging lens 126 with respect to beams A and B are different from each other. The recording beam A is converged by converging lens 126 and thereafter is converged again by second converging lens 128 and is guided to light-receiving element 129 divided into two portions and detecting the focus signal. At this time, a focus error signal is detected by the known knife edge method using a knife edge by prism mirror 130 projecting onto the optical axis. A beam portion from converging lens 128 is reflected by prism mirror 130 and is guided to light-receiving element 131 as a detector for detecting the track signal. This track signal is detected by the known push-pull method. The focus error signal and the track error signal thus provided are used for the focus/track servo control of an actuator of the optical pickup (objective lens 125). FIG. 4 shows track servo circuit 132 as a tracking control system based on light-receiving element 131.

In addition to optical system 127 with respect to light-receiving elements 129 and 131 relating to preceding beam A for record, optical system 137 relating to subsequent beam B for confirmation and reproduction is disposed with respect to light-receiving element 135 for detecting the focus signal and light-receiving element 136 as a detector for detecting the track signal. Optical system 137 is disposed on the reflected side of prism mirror 133 arranged in the vicinity of a converging point of converging lens 126. Similar to optical system 127, optical system 137 includes converging lens 138 and knife edge prism 139. The focus signal is detected by light-receiving element 135 by the knife edge method, and the track signal is detected by light-receiving element 136 by the push-pull method. An output of light-receiving 135 for the track error signal is supplied to tangential servo circuit 140 constituting a tangential control system to perform the tangential servo control.

In such a construction, when the track error signal is detected by light-receiving element 131 based on preceding beam A for record, this signal is outputted to track servo circuit 132 and the actuator for driving the objective lens is operated and the servo control is performed such that the spot is correctly located on the track and the track error signal is 0 in voltage.

In such a control, the relation in position between two spots SA and SB with respect to track 141 on optical disk 124 will next be described with reference to FIGS. 5a to 5c. First, in accordance with the above-mentioned control, preceding spot SA for record is located onto track 141 by the tracking servo control. At this time, when there is no eccentricity of optical disk 124, as shown in FIG. 5a, recording spot SA and spot SB for confirmation and reproduction are located in positions equally separated from disk center C so that spot SB for confirmation and reproduction is correctly located on track 141.

Figures 5A, 5B, 5C:
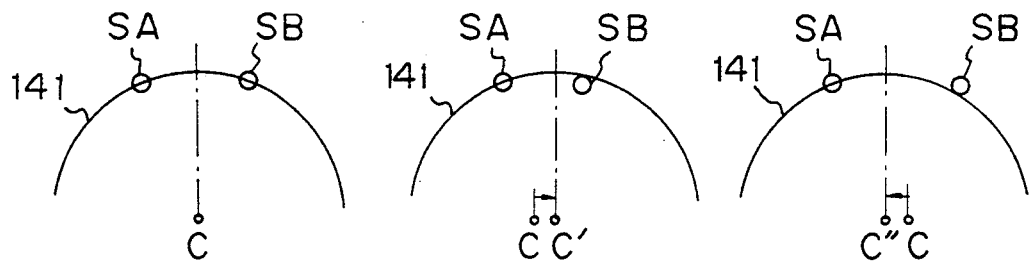
FIGS. 5a to 5c are plan views showing states of a track shift by eccentricity of the optical disk.

However, as shown in FIG. 5b for example, when the center of optical disk 124 is eccentric on the right-hand side and is located on C', a track shift is caused on the inner circumferential side from the track with respect to spot SB for confirmation and reproduction even when recording spot SA is correctly located on track 141 by the tracking servo control. Such a track shift is detected by light-receiving element 136. The track error signal (including that is the shifting direction) detected by light-receiving element 136 is outputted to tangential servo circuit 140 to perform the servo control with respect to the actuator for the objective lens in the tangential direction (circumferential direction) reverse to the eccentric direction of optical disk 124. Namely, as shown in FIG. 5b, when the optical disk is eccentric in the right-hand direction, the track error signal of spot SB for confirmation and reproduction becomes negative in voltage. Therefore, objective lens 125 is correspondingly displaced tangentially in the right-hand direction. Thus, recording spot SA and spot SB for confirmation and reproduction are correctly located on track 141 so that the recording operation and the confirming and reproducing operations are reliably performed.

FIG. 5c shows a case in which optical disk 124 is eccentric on the left-hand side and the center thereof is C''. In this case, even when recording spot SA is correctly located on track 141 by the tracking servo operation, a track shift is caused on the outer circumferential side from the track with respect to spot SB for confirmation and reproduction. Such a track shift is detected by light-receiving element 136. The track error signal detected by light-receiving element 136 is outputted to tangential servo circuit 140 to perform the servo control with respect to the actuator for the objective lens in the tangential direction. Namely, as shown in FIG. 5c, when the optical disk is eccentric in the left-hand direction, the track error signal of spot SB for confirmation and production becomes positive in voltage so that objective lens 125 is correspondingly displaced tangentially in the left-hand direction. Thus, recording spot SA and spot SB for confirmation and reproduction are correctly located on track 141 so that the recording operation and the confirming and reproducing operations are reliably performed.

Track servo circuit 132 and tangential servo circuit 140 may be exchanged such that the tracking servo control is performed with respect to subsequent beam B and the tangential servo control is performed with respect to preceding servo A.

As mentioned above, in accordance with the present invention, the track error signal is detected with respect to both the preceding and subsequent beams. Based on one of the track error signals, the tracking servo operation is performed by the tracking control system with respect to the one beam. When the track error signal is generated with respect to the other beam, the tangential servo operation is performed by the tangential control system. Accordingly, it is possible to perform the tracking servo control in a state in which there is no influence on the eccentricity of the optical disk. Thus, it is possible to correctly located both beams on the track so that the reliable recording and confirming and reproducing operations can be performed.

Many widely different embodiments of the present invention may be constructed without departing from the spirit and scope of the present invention. It should be understood that the present invention is not limited to the specific embodiments described in the specification, except as defined in the appended claims.

What is claimed is:

1. A servo method in a multibeam optical pickup for simultaneously focusing and positioning respective spots of recording and reproducing beams on an optical disk when reproducing and confirming information being recorded on said optical disk while said information is being simultaneously recorded on said optical disk by said recording beam in a recording mode, and when reproducing said recorded information using said reproducing beam in a reproducing mode; said reproducing beam and said recording beam being emitted by at least one light source and being identical in wavelength with each other, said method comprising the steps of:

detecting a first focus servo signal and a first track servo signal with respect to said recording beam reflected from said optical disk;

detecting a second focus servo signal and a second track servo signal with respect to said reproducing beam reflected from said optical disk;

performing a focusing operation of said recording beam based on said first focus servo signal and performing a tracking operation of said recording beam based on said first track servo signal in said recording mode; and performing a focusing operation of said reproducing beam based on said second focus servo signal and performing a tracking operation of said reproducing beam based on said second track servo signal in said reproducing mode.

2. A servo method according to claim 1, wherein said recording beam and said reproducing beam are guided onto said optical disk by a common optical path.

3. A servo method according to claim 1, wherein said method further comprises the steps of modulating a light intensity of said recording beam controlled by said first focus servo signal and said first track servo signal and emitting continuously said reproducing beam at a constant light intensity in said recording mode.

4. A servo method according to claim 3, wherein said method further comprises the step of emitting continuously said reproducing beam at a constant intensity in said reproducing mode.

5. A servo method in a multibeam optical pickup for simultaneously focusing and positioning respective spots of recording and reproducing beams on an optical disk when reproducing and confirming information being recorded on said optical disk while said information is being simultaneously recorded on said optical disk by said recording beam in a recording mode, and when reproducing said recorded information using said reproducing beam in a reproducing mode, said reproducing beam and said recording beam being emitted by at least one light source and being identical in wavelength with each other, said method comprising the steps of:

> detecting a focus servo signal and a track servo signal with respect to one beam of said recording beam and said reproducing beam, each of which is reflected from said optical disk;
>
> detecting a track servo signal with respect to the other beam of said recording beam and said reproducing beam;
>
> performing a tracking operation of said recording beam based on said track servo signal detected from said recording beam and performing a focusing operation of said recording beam based on said focus servo signal in said recording mode; and
>
> performing a tracking operation of said reproducing beam based on said track servo signal detected from said reproducing beam and performing a focusing operation of said reproducing beam based on said focus servo signal in said reproducing mode.

6. A servo method according to claim 5, wherein said one beam is said recording beam and wherein said other beam is said reproducing beam.

7. A servo method according to claim 5, wherein said recording beam and said reproducing beam are guided onto said optical disk by a common optical path.

8. A servo method according to claim 5, wherein said method further comprises emitting said reproducing beam continuously at a constant light intensity in both of said recording mode and said reproducing mode.

9. An optical pickup of an optical disk apparatus for recording or erasing information on an optical disk by a preceding recording beam, and reproducing and confirming recorded information on said optical disk by a subsequent reproducing beam, said subsequent reproducing beam and said preceding recording beam being simultaneously focused and positioned by said optical pickup, being emitted by at least one light source and being identical in wavelength with each other, said optical pickup comprising:

> a detecting means for detecting a first track error signal with respect to one beam of said preceding recording beam and said subsequent reproducing beam, and for detecting a second track error signal with respect to the other beam of said preceding recording beam and said subsequent reproducing beam;
>
> a tracking control means for converging said one beam onto a track of said optical disk based on said first track error signal; and
>
> a tangential control means for converging said other beam onto said track of said optical disk based on said second track error signal.

10. An optical pickup according to claim 9, wherein said one beam is said preceding recording beam and wherein said other beam is said subsequent reproducing beam.

11. An optical pickup according to claim 9, wherein said one beam is said subsequent reproducing beam and wherein said other beam is said preceding recording beam.

12. A method for recording information on an optical disk and reproducing information from said optical disk using a multibeam optical pickup simultaneously emitting first and second beams identical in wavelength with each other, said method comprising the steps of:

> recording information on said optical disk by using said first beam while simultaneously reproducing recorded information by using said second beam so as to confirm said recorded information;
>
> reproducing information on said optical disk by using only said second beam;
>
> detecting a first focus servo signal and a first track servo signal with respect to said first beam reflected from said optical disk;
>
> detecting a second focus servo signal and a second track servo signal with respect to said second beam reflected from said optical disk;
>
> performing a focusing operation of said first beam based on said first focus servo signal and performing a tracking operation of said first beam based on said first track servo signal; and
>
> performing a focusing operation of said second beam based on said second focus servo signal simultaneously with the focusing operation of said first beam and performing a tracking operation of said second beam based on said second track servo signal simultaneously with the tracking operation of said first beam.

13. A method according to claim 12, wherein said first beam and said second beam are guided onto said optical disk by a common optical path.

14. A method according to claim 12, wherein said information is recorded by modulating a light intensity of said first beam controlled by said first focus servo signal and said first track servo signal while reproducing and confirming said information by emitting continuously and simultaneously said second beam at a constant light intensity.

15. A method according to claim 14, wherein said information is reproduced by emitting continuously said second beam at a constant intensity.

* * * * *